(12) United States Patent
Alexander

(10) Patent No.: US 11,912,361 B1
(45) Date of Patent: Feb. 27, 2024

(54) VEHICULAR PARALLEL PARKING SYSTEM

(71) Applicant: Gemma Alexander, Queens, NY (US)

(72) Inventor: Gemma Alexander, Queens, NY (US)

( * ) Notice: Subject to any disclaimer, the term of this patent is extended or adjusted under 35 U.S.C. 154(b) by 828 days.

(21) Appl. No.: 17/027,826

(22) Filed: Sep. 22, 2020

(51) Int. Cl.
| | | |
|---|---|---|
| *B62D 9/00* | (2006.01) | |
| *B60K 1/02* | (2006.01) | |
| *B62D 5/04* | (2006.01) | |
| *B60K 1/04* | (2019.01) | |
| *B60G 15/06* | (2006.01) | |
| *B60G 17/015* | (2006.01) | |

(52) U.S. Cl.
CPC .............. *B62D 9/00* (2013.01); *B60G 15/062* (2013.01); *B60G 15/067* (2013.01); *B60G 17/015* (2013.01); *B60K 1/02* (2013.01); *B60K 1/04* (2013.01); *B62D 5/046* (2013.01)

(58) Field of Classification Search
CPC ........ B62D 9/00; B62D 5/046; B60G 15/062; B60G 15/067; B60G 17/015; B60K 1/02; B60K 1/04
See application file for complete search history.

(56) References Cited

U.S. PATENT DOCUMENTS

| | | | | |
|---|---|---|---|---|
| 3,003,571 A | | 10/1961 | Ash | |
| 3,120,398 A | * | 2/1964 | Butterworth | B60S 9/20 |
| | | | | 180/199 |
| 3,826,322 A | * | 7/1974 | Williams | B60S 9/215 |
| | | | | 180/209 |
| 4,605,086 A | * | 8/1986 | Marom | B60S 9/215 |
| | | | | 254/420 |
| 4,998,595 A | * | 3/1991 | Yeh | B60S 9/215 |
| | | | | 180/202 |
| 5,447,210 A | * | 9/1995 | Lai | B60S 9/215 |
| | | | | 180/202 |
| D454,807 S | | 3/2002 | Cappiello | |
| 7,921,952 B2 | * | 4/2011 | Tseng | B60S 9/215 |
| | | | | 180/199 |
| 8,108,104 B2 | * | 1/2012 | Hrovat | B60G 17/0162 |
| | | | | 280/5.509 |
| 8,169,341 B2 | | 5/2012 | Toledo | |
| 9,592,826 B2 | | 3/2017 | Lavoie | |
| 9,754,173 B2 | * | 9/2017 | Kim | G08G 1/143 |
| 2015/0094925 A1 | * | 4/2015 | Senoo | B60T 8/58 |
| | | | | 701/70 |

FOREIGN PATENT DOCUMENTS

| | | | | |
|---|---|---|---|---|
| WO | WO-2005069478 A1 | * | 7/2005 | B60L 58/12 |
| WO | 2007119301 | | 10/2007 | |

\* cited by examiner

*Primary Examiner* — Jacob D Knutson
(74) *Attorney, Agent, or Firm* — Kyle A. Fletcher, Esq.

(57) ABSTRACT

The vehicular parallel parking system is a mechanical structure. The vehicular parallel parking system is configured for use with a vehicle. The vehicular parallel parking system rotates the primary sense of direction of the vehicle by 90 degrees such that the vehicle can be driven directly into a parking spot during parallel parking activities. The vehicular parallel parking system incorporates a plurality of suspension structures, and a control circuit into the vehicle. The vehicle further comprises a vehicle engine, a vehicle chassis, and a plurality of wheels. The plurality of suspension structures attach the plurality of wheels to the vehicle chassis. Each of the plurality of suspension structures are rotating structures. The rotation of each of the plurality of suspension structures changes the primary sense of direction.

19 Claims, 12 Drawing Sheets

VEHICULAR PARALLEL PARKING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including maneuvering a vehicle not otherwise provided for, more specifically, a power driven ground engaging vehicle fitting for maneuvering a vehicle. (B6059/215)

SUMMARY OF INVENTION

The vehicular parallel parking system is a mechanical structure. The vehicular parallel parking system is configured for use with a vehicle. The vehicular parallel parking system is defined with a primary sense of direction. The vehicular parallel parking system rotates the primary sense of direction of the vehicle by 90 degrees such that the vehicle can be driven directly into a parking spot during parallel parking activities. The vehicular parallel parking system comprises the vehicle, a plurality of suspension structures, and a control circuit. The vehicle further comprises a vehicle engine, a vehicle chassis, and a plurality of wheels. The plurality of suspension structures attach the plurality of wheels to the vehicle chassis. Each of the plurality of suspension structures are rotating structures. The rotation of each of the plurality of suspension structures changes the primary sense of direction. The control circuit is an electromechanical structure. The control circuit provides the motive forces necessary to rotate the plurality of suspension structures.

These together with additional objects, features and advantages of the vehicular parallel parking system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular parallel parking system in detail, it is to be understood that the vehicular parallel parking system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular parallel parking system.

It is therefore important that the claims be regarded as including such equivalent construction insofar as they do not depart from the spirit and scope of the vehicular parallel parking system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
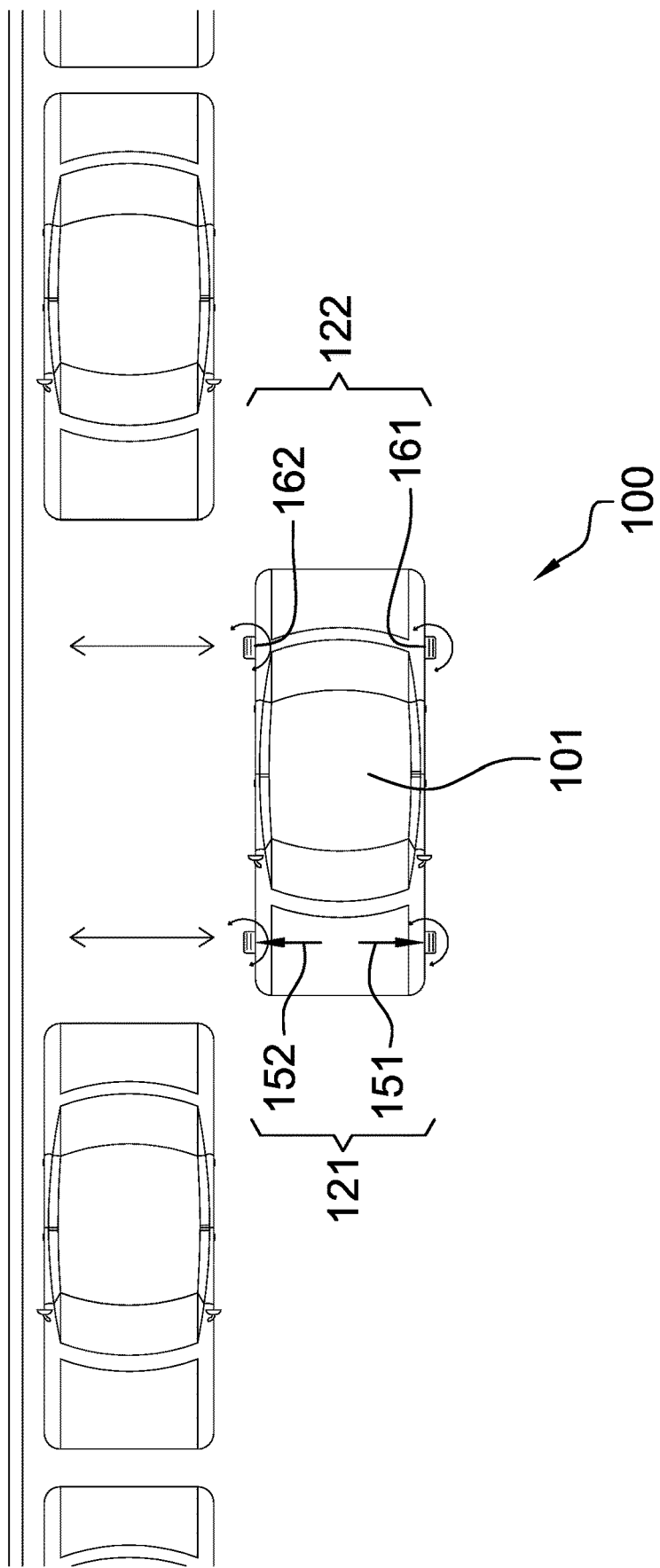
FIG. 1 is an in-use view of an embodiment of the disclosure.
Figure 2:
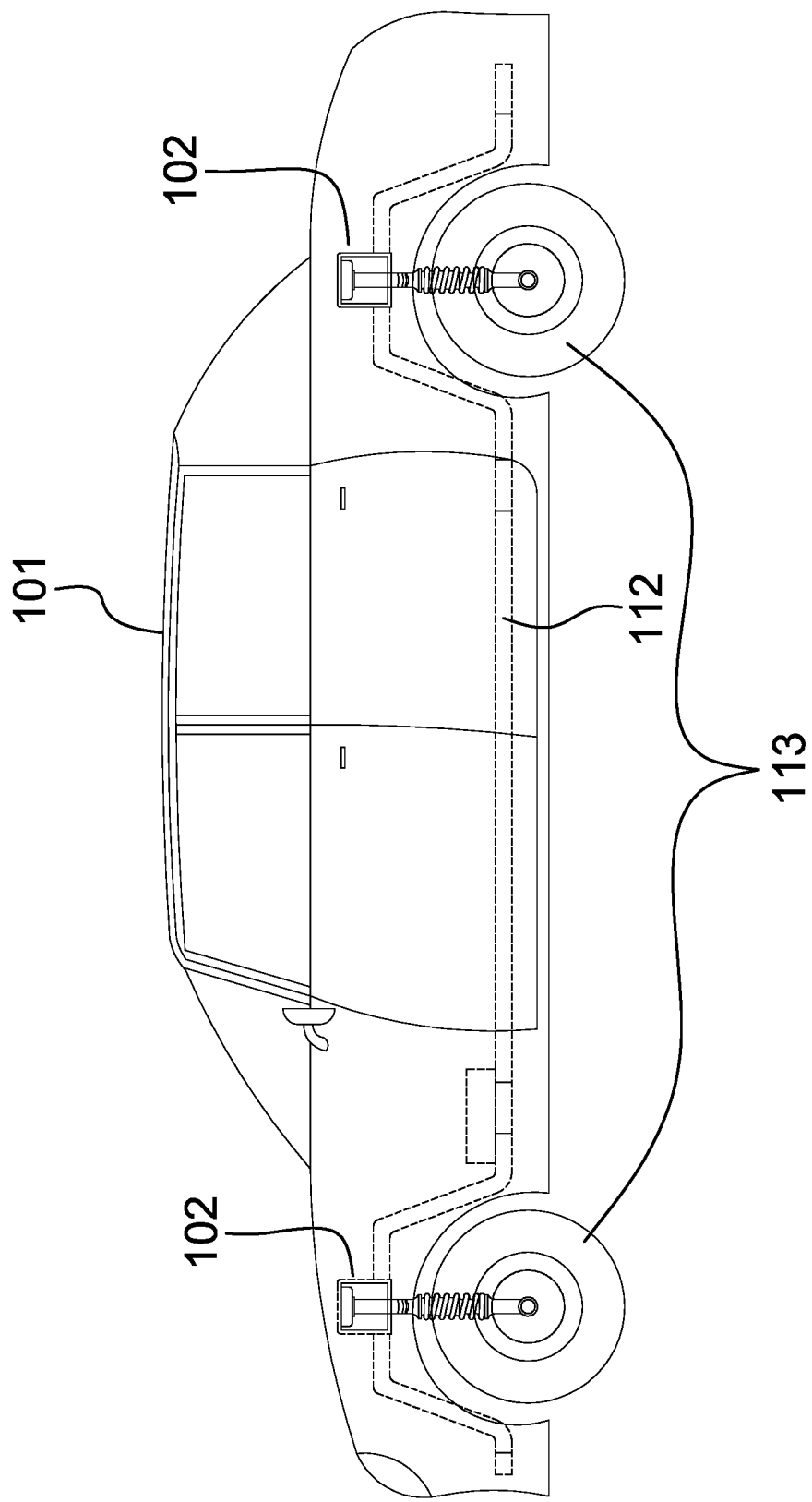
FIG. 2 is a side view of an embodiment of the disclosure.
Figure 3:
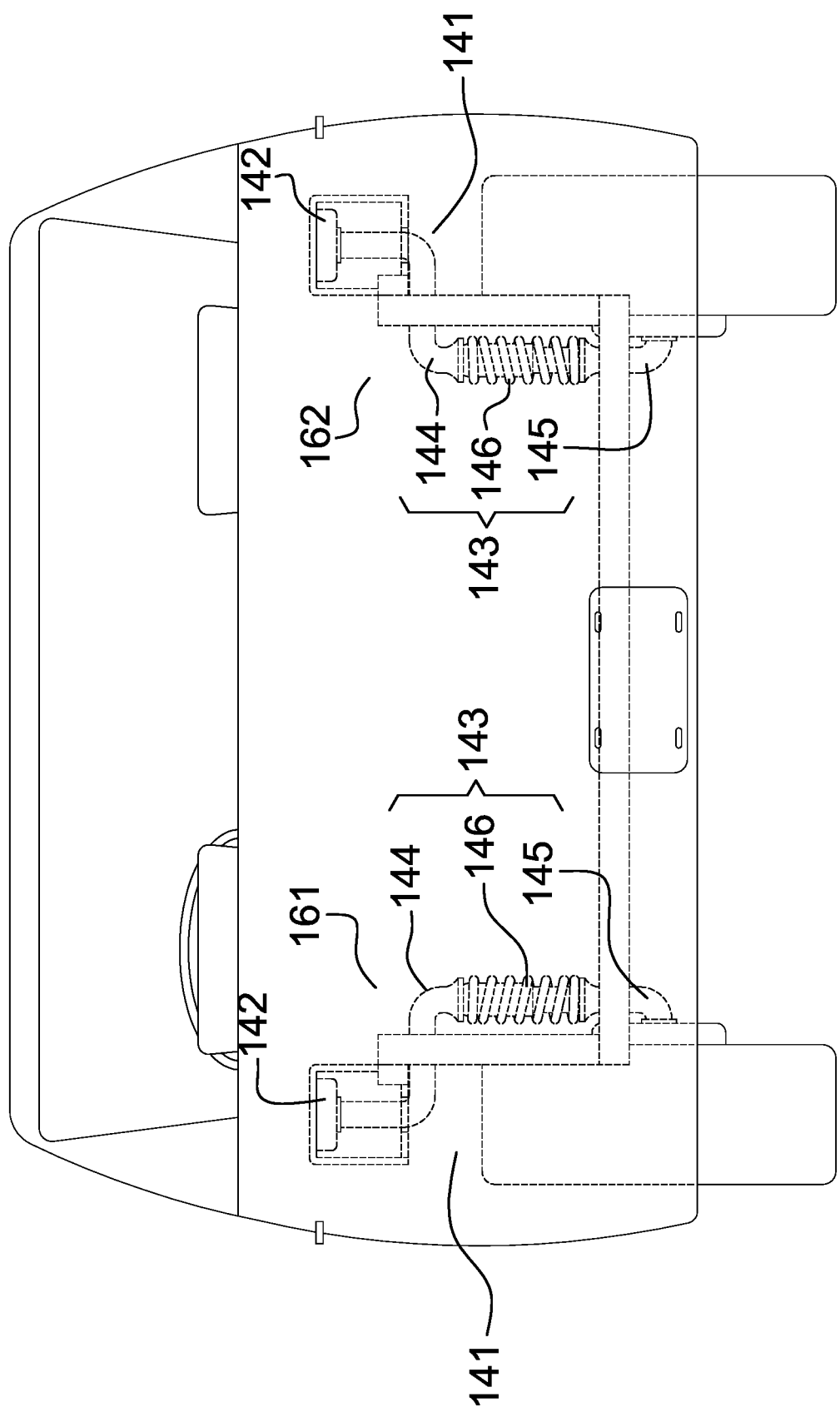
FIG. 3 is a rear view of an embodiment of the disclosure.
Figure 4:
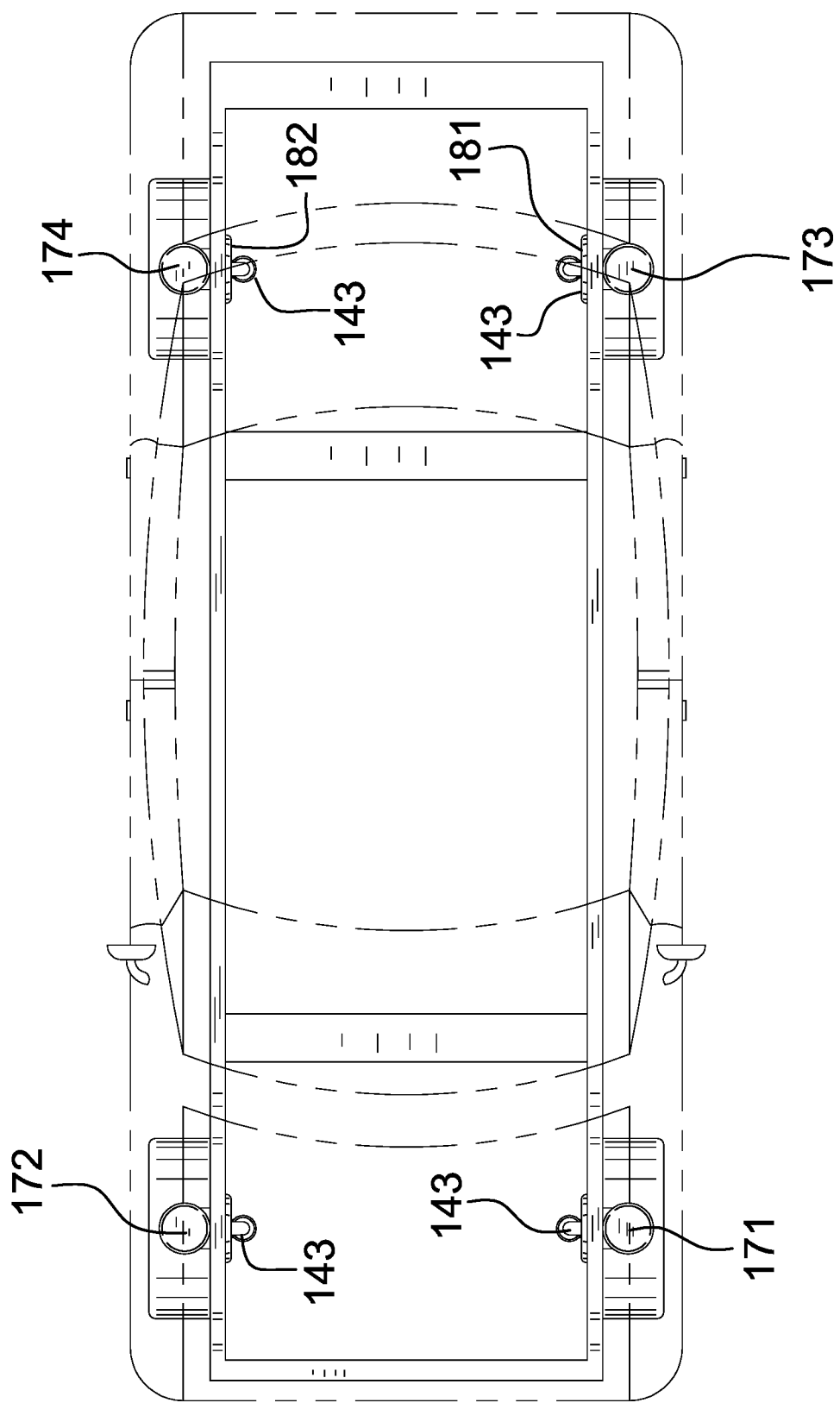
FIG. 4 is a superior view of an embodiment of the disclosure.
Figure 5:
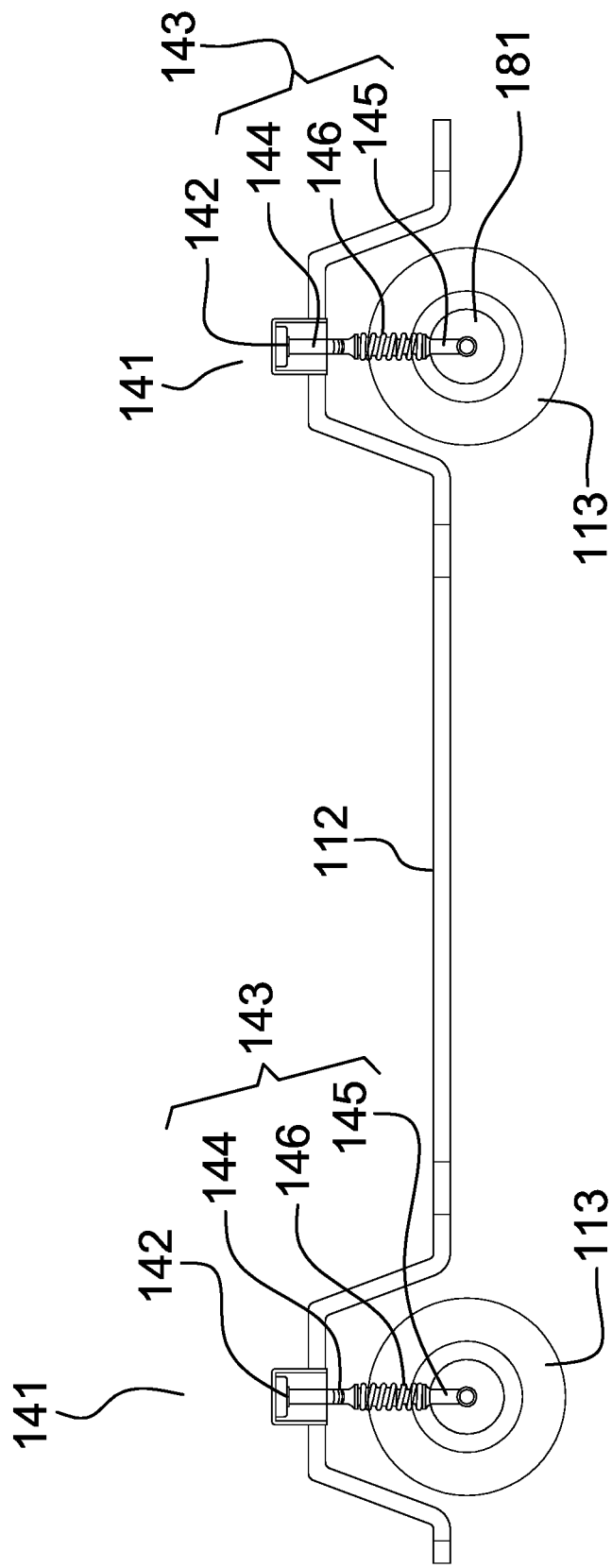
FIG. 5 is a detail side view of an embodiment of the disclosure.
Figure 6:
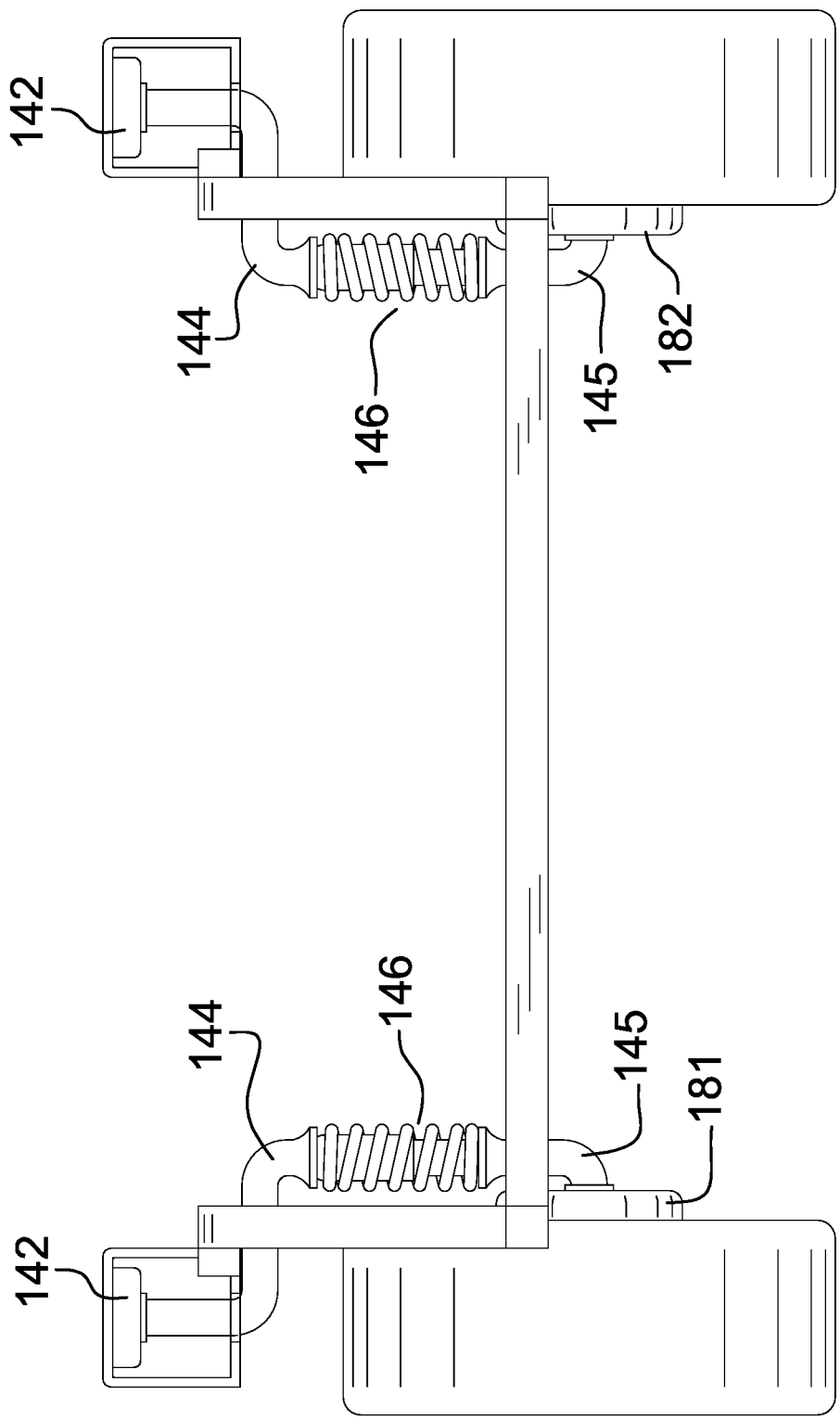
FIG. 6 is a detail rear view of an embodiment of the disclosure.
Figure 7:
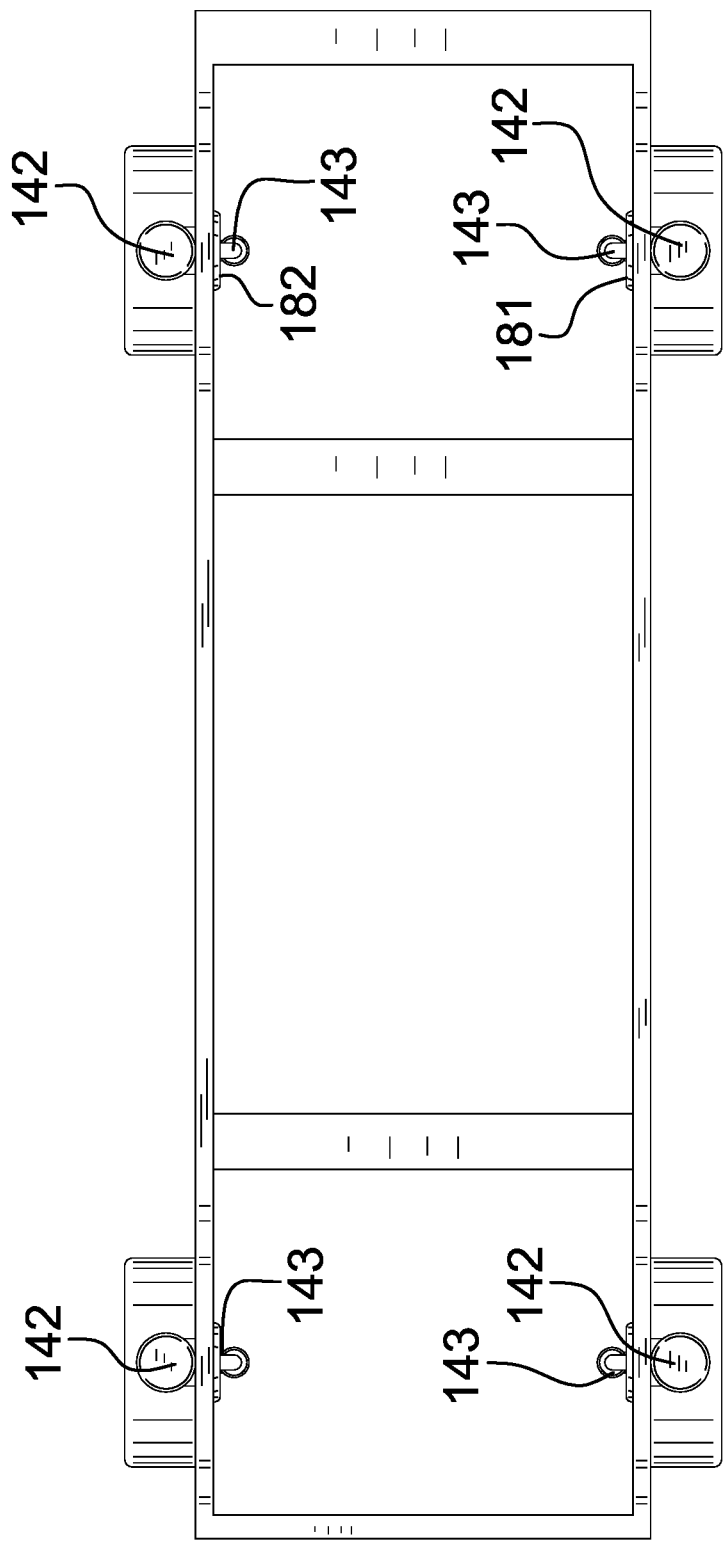
FIG. 7 is a detail superior view of an embodiment of the disclosure.
Figure 8:
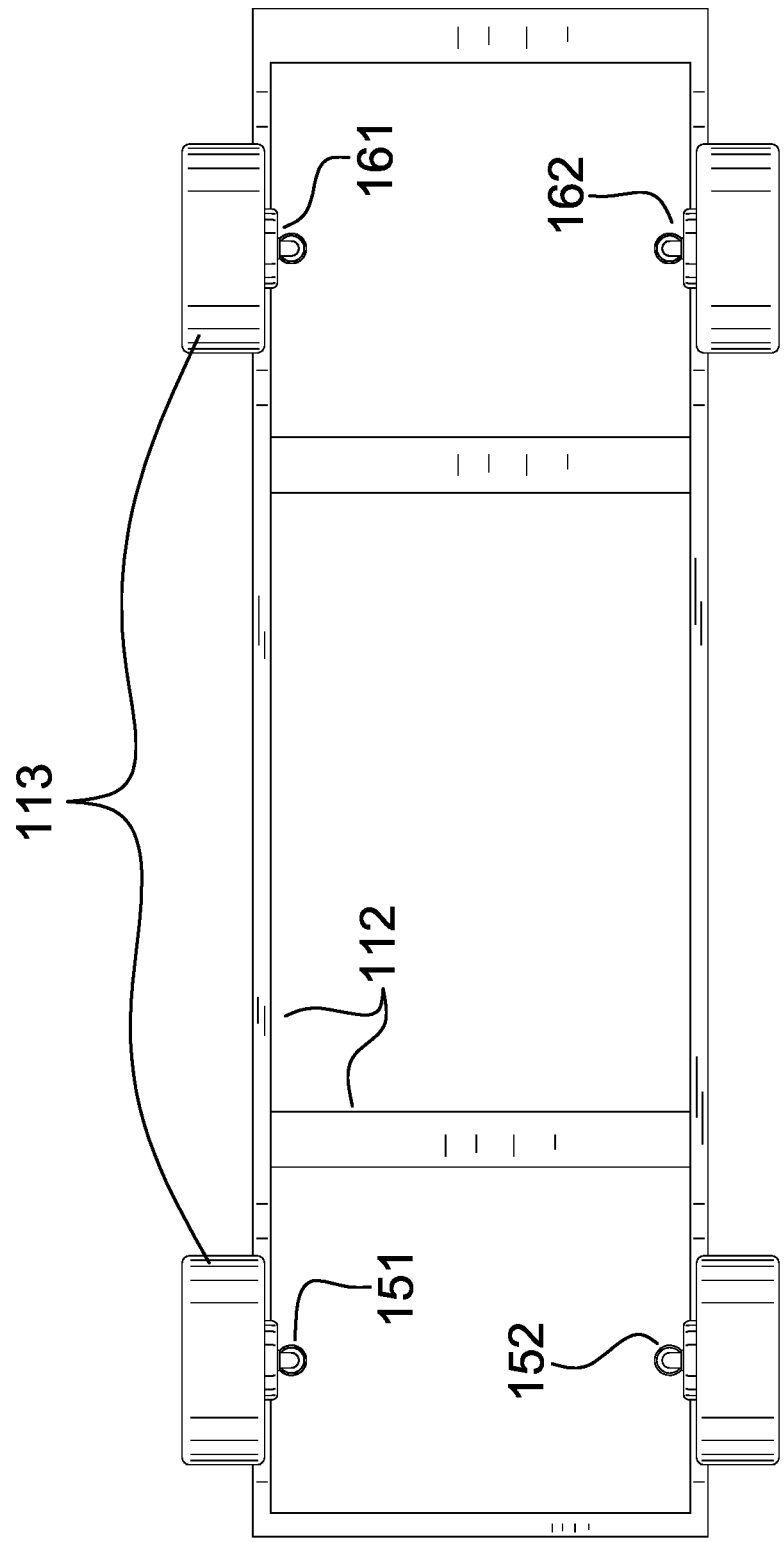
FIG. 8 is a detail inferior view of an embodiment of the disclosure.
Figure 9:
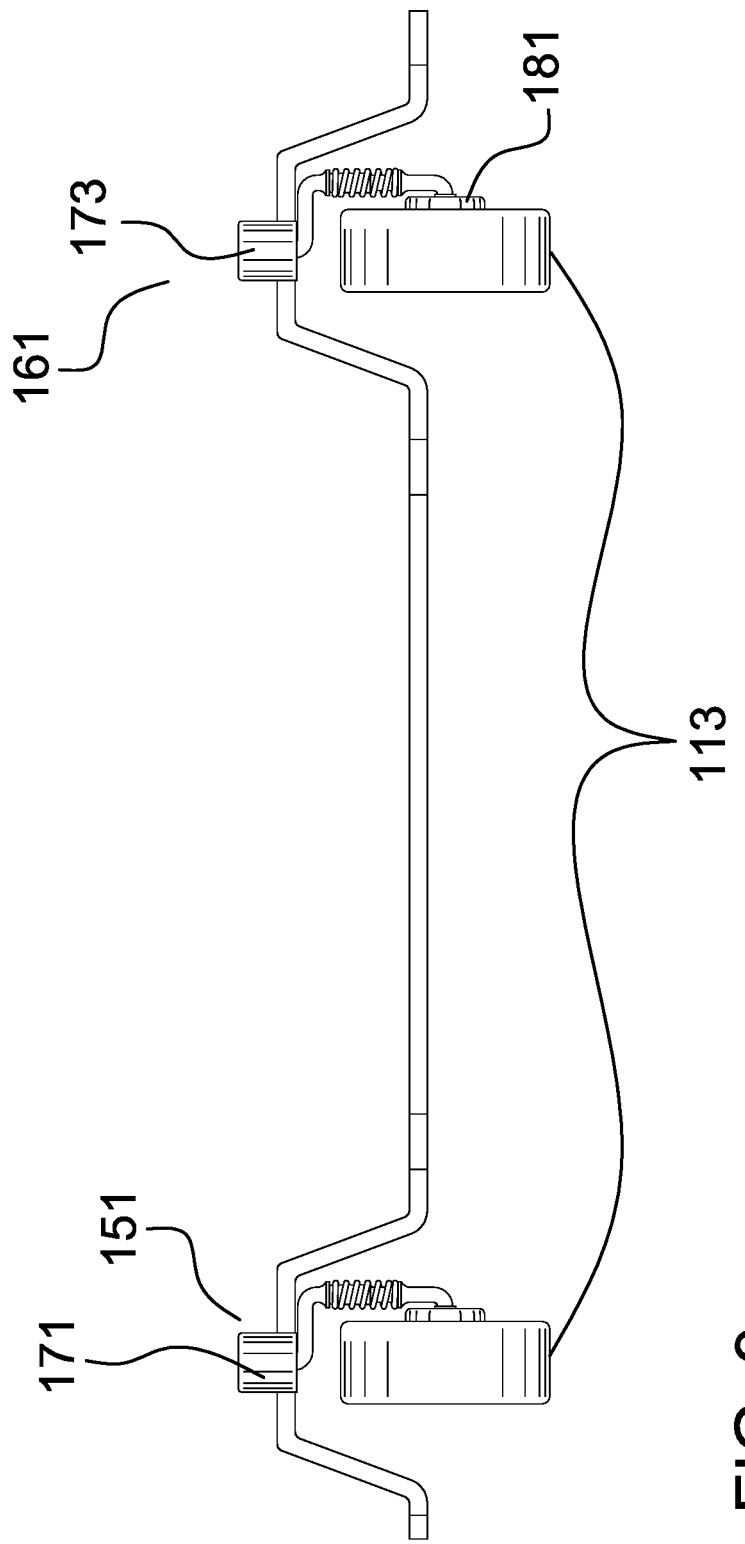
FIG. 9 is a detail side view of an embodiment of the disclosure.
Figure 10:
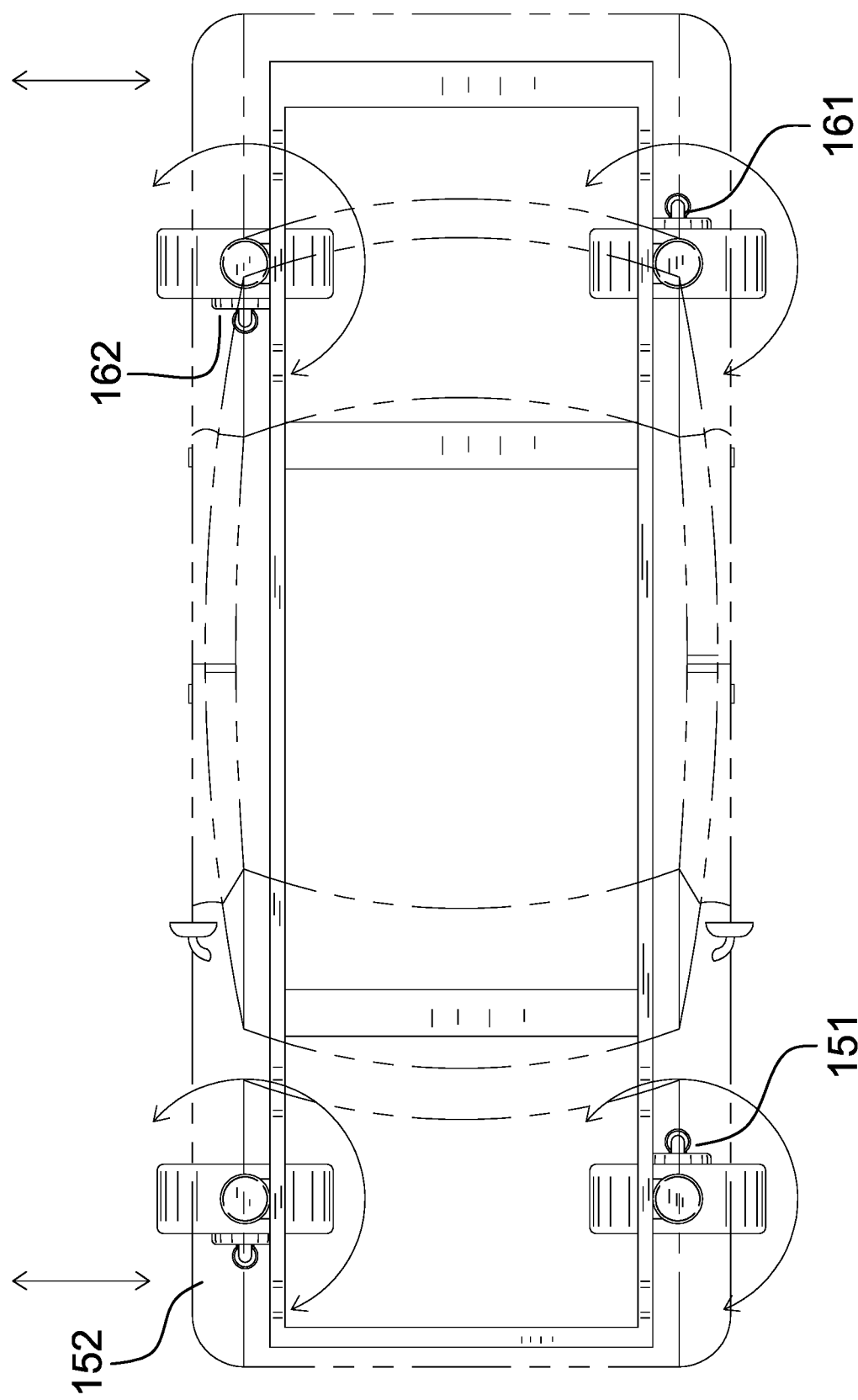
FIG. 10 is a detail superior view of an embodiment of the disclosure.
Figure 11:
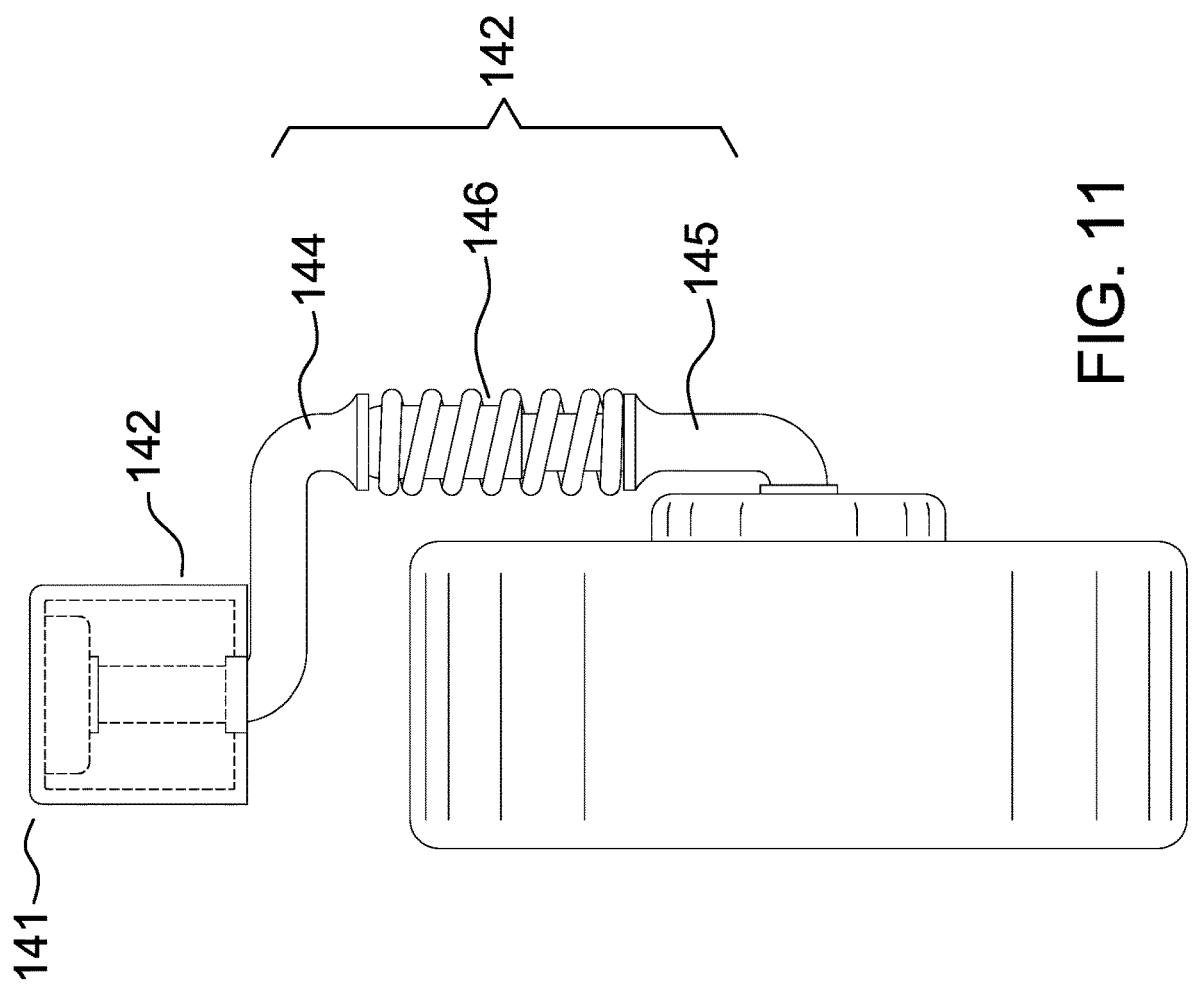
FIG. 11 is a detail view of an embodiment of the disclosure.
Figure 12:
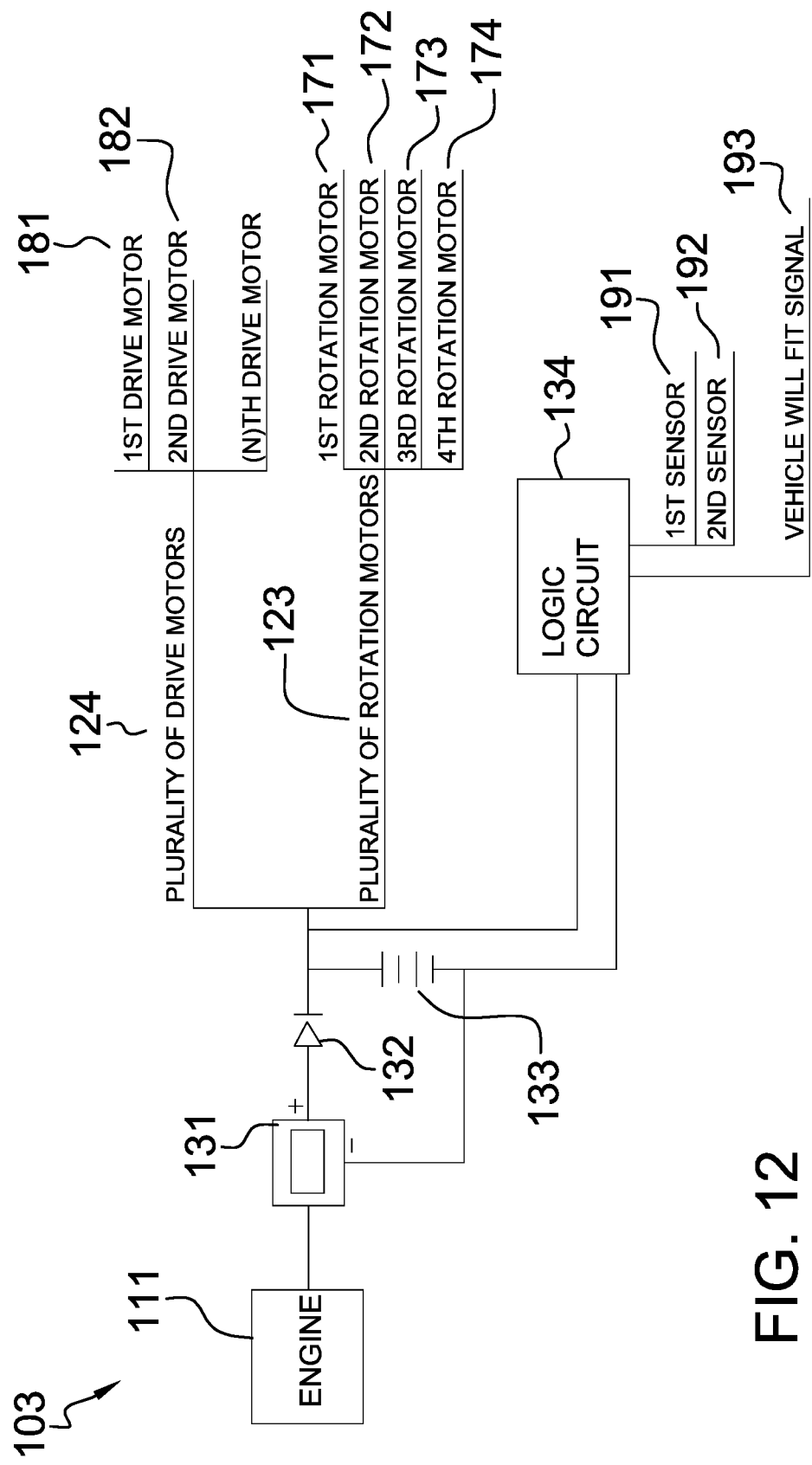
FIG. 12 is a block diagram of an embodiment of the disclosure.

Detailed reference will now be made to one or more potential embodiments of the disclosure, which are illustrated in FIGS. 1 through 12.

The vehicular parallel parking system 100 (hereinafter invention) is a mechanical structure. The invention 100 is configured for use with a vehicle 101. The invention 100 is defined with a primary sense of direction. The invention 100 rotates the primary sense of direction of the vehicle 101 by ninety degrees such that the vehicle 101 can be driven directly into a parking spot during parallel parking activities. The invention 100 comprises the vehicle 101, a plurality of suspension structures 102, and a control circuit 103. The vehicle 101 further comprises a vehicle 101 engine 111, a vehicle 101 chassis 112, and a plurality of wheels 113. The plurality of suspension structures 102 attach the plurality of wheels 113 to the vehicle 101 chassis 112. Each of the plurality of suspension structures 102 are rotating structures. The rotation of each of the plurality of suspension structures 102 changes the primary sense of direction. The control circuit 103 is an electromechanical structure. The control circuit 103 provides the motive forces necessary to rotate the plurality of suspension structures 102.

The vehicle 101 is a motorized device used to transport people and goods over a road network. The vehicle 101 is defined elsewhere in this disclosure. The vehicle 101 comprises a vehicle 101 engine 111, a vehicle 101 chassis 112, and a plurality of wheels 113.

The vehicle 101 engine 111 is a combustion engine. The terms engine and combustion engine are defined elsewhere in this disclosure. The vehicle 101 engine 111 converts a first source of chemical potential energy into rotational energy. The vehicle 101 engine 111 uses a combustion reaction to generate rotational mechanical energy that drives the operation of the control circuit 103.

The vehicle 101 chassis 112 is an intermediate structure. The vehicle 101 chassis 112 forms a pedestal structure that transfers the load of the vehicle 101 to the plurality of wheels 113 through the plurality of suspension structures 102. The plurality of suspension structures 102 attaches each of the plurality of wheels 113 to the vehicle 101 chassis 112 such that each of the plurality of wheels 113 rotates freely in two perpendicular directions relative to the vehicle 101 chassis 112. Each of the plurality of wheels 113 are attached to the plurality of wheels 113 such that the vehicle 101 will roll over a road network. The terms wheel, roll, and tire are defined elsewhere in this disclosure.

Each of the plurality of suspension structures 102 is a mechanical structure. Each of the plurality of suspension structures 102 attaches a wheel selected from the plurality of wheels 113 to the vehicle 101 chassis 112. The selected wheel associated with each suspension structure selected from the plurality of suspension structures 102 attaches to the selected structure such that the wheel freely rolls in the primary sense of direction of the vehicle 101.

Each of the plurality of suspension structures 102 is a rotating structure. Each of the plurality of suspension structures 102 rotates along an axis of rotation that is vertically oriented. The axis of rotation of each suspension structure of the plurality of suspension structures 102 is perpendicular to the axis of rotation of the associated selected wheel. The rotation of each of the plurality of suspension structures 102 changes the primary sense of direction of the vehicle 101 by changing the direction of rotation of each of the plurality of wheels 113. The plurality of suspension structures 102 changes the primary sense of direction of the vehicle 101 such that the vehicle 101 drives directly into a parallel parking spot in a single maneuver.

The plurality of suspension structures 102 comprises a plurality of non-driven suspension structures 121 and a plurality of driven suspension structures 122. The plurality of suspension structures 102 further comprises a plurality of rotation motors 123 and a plurality of drive motors 124. Each of the plurality of rotation motors 123 is an electric motor used to rotate the individual non-driven suspension structure 141 of each of the plurality of non-driven suspension structures 121. Each of the plurality of drive motors 124 is an electric motor used to drive one or more wheels selected from the plurality of wheels 113 such that the driven wheels will move the vehicle 101 in its primary sense of direction.

Each of the plurality of non-driven suspension structures 121 is a mechanical structure. Each of the plurality of non-driven suspension structures 121 attaches a wheel selected from the plurality of wheels 113 to the vehicle 101 chassis 112. Each of the plurality of non-driven suspension structures 121 is a rotating structure. By rotating is meant that each of the plurality of non-driven suspension structures 121 around a vertically oriented axis of rotation. The rotation of each of the plurality of non-driven suspension structures 121 adjusts the orientation of the associate wheel relative to the vehicle 101 chassis 112 such that the primary sense of direction of the vehicle 101 is changed. The plurality of non-driven suspension structures 121 comprises a collection of individual non-driven wheel structures 141.

The individual non-driven suspension structure 141 is a mechanical structure. The individual non-driven suspension structure 141 forms a load path that transfers the load of the vehicle 101 to a wheel selected from the plurality of wheels 113. The individual non-driven suspension structure 141 is a rotating structure. The individual non-driven suspension structure 141 rotates the orientation of the wheel selected form the plurality of wheels 113 such that the primary sense of the direction of the vehicle 101 is adjusted. The center of rotation of the individual non-driven suspension structure 141 is vertically oriented. The individual non-driven suspension structure 141 is further configured to buffer the transfer of impact energy between the plurality of wheels 113 and the vehicle 101 chassis 112. Each individual non-driven suspension structure 141 comprises an individual rotation motor 142 and a suspension jib 143.

The individual rotation motor 142 is an electric motor. The individual rotation motor 142 attaches the suspension jib 143 to the vehicle 101 chassis 112. The individual rotation motor 142 is selected from the plurality of rotation motors 123. The individual rotation motor 142 rotates the suspension jib 143 relative to the vehicle 101 chassis 112 such that the center of rotation of the suspension jib 143 is vertically oriented. The individual rotation motor 142 rotates the suspension jib 143 such that the wheel attached to the suspension jib 143 rotates to adjust the primary sense of direction of the vehicle 101.

The suspension jib 143 forms an extension structure that attaches the wheel selected from the plurality of wheels 113 that is associated with the individual non-driven suspension structure 141 to the individual rotation motor 142. The suspension jib 143 is a non-Euclidean structure. The suspension jib 143 attaches to the wheel associated with the individual non-driven suspension structure 141 such that the wheel rotates freely relative to the suspension jib 143 around a horizontally oriented center of rotation. The suspension jib 143 attaches to the individual rotation motor 142 such that the rotation of the individual rotation motor 142 rotates the suspension jib 143 and the attached wheel around a vertically oriented center of rotation that is aligned with the center of rotation of the individual rotation motor 142. The suspension jib 143 forms a buffer that physically dampens the transfer of impact energy between the plurality of wheels 113 and the vehicle 101 chassis 112 through the individual non-driven suspension structure 141. The suspension jib 143 further comprises a superior jib 144, an inferior jib 145, and a shock absorber 146.

The shock absorber 146 attaches the inferior jib 145 to the superior jib 144. The shock absorber 146 forms the buffer that physically dampens the transfer of impact energy between the plurality of wheels 113 and the vehicle 101 chassis 112. Specifically, the shock absorber 146 is a spring structure that stores and dissipates the received impact energy. The superior jib 144 is a non-Euclidean prism-shaped structure. The superior jib 144 is a rigid mechanical structure that physically attaches the shock absorber 146 to the individual rotation motor 142. The inferior jib 145 is a non-Euclidean prism-shaped structure. The inferior jib 145 is a rigid mechanical structure that physically attaches the shock absorber 146 to the associated wheel selected from the plurality of wheels 113.

Each of the plurality of driven suspension structures 122 is a mechanical structure. Each of the plurality of driven suspension structures 122 attaches a wheel selected from the plurality of wheels 113 to the vehicle 101 chassis 112. Each of the plurality of driven suspension structures 122 is a rotating structure. By rotating is meant that each of the plurality of driven suspension structures 122 rotates around a vertically oriented axis of rotation. The rotation of each of the plurality of driven suspension structures 122 adjusts the orientation of the associated wheel relative to the vehicle 101 chassis 112 such that the primary sense of direction of the vehicle 101 is changed. The plurality of driven suspension structures 122 provides the motive force necessary to rotate the wheel associated with any selected driven suspension structure such that the vehicle 101 will move in the primary sense of direction of the vehicle 101.

Each of the plurality of driven suspension structures 122 is an individual non-driven suspension structure 141 that further comprises a drive motor selected from a plurality of drive motors 124.

In the first potential embodiment of the disclosure, the plurality of non-driven suspension structures 121 comprises a first non-driven suspension structure 151 and a second non-driven suspension structure 152. The plurality of driven suspension structures 122 comprises a first driven suspension structure 161 and a second driven suspension structure 162. The plurality of rotation motors 123 comprises a first rotation motor 171, a second rotation motor 172, a third rotation motor 173, and a fourth rotation motor 174. The plurality of drive motors 124 comprises a first drive motor 181 and a second drive motor 182.

The first non-driven suspension structure 151 is an individual non-driven suspension structure 141. The first non-driven suspension structure 151 attaches the forward port wheel selected from the plurality of wheels 113 to the vehicle 101 chassis 112. The second non-driven suspension structure 152 is an individual non-driven suspension structure 141. The second non-driven suspension structure 152 attaches the forward starboard wheel selected from the plurality of wheels 113 to the vehicle 101 chassis 112.

The first driven suspension structure 161 attaches the aft port wheel selected from the plurality of wheels 113 to the vehicle 101 chassis 112. The first driven suspension structure 161 is a structure that is identical to the individual non-driven suspension structure 141. The first driven suspension structure 161 further comprises the first drive motor 181. The first drive motor 181 attaches the associated wheel to the inferior jib 145 of the individual non-driven suspension structure 141 of the first driven suspension structure 161 such that the rotation of the first drive motor 181 will drive the associated wheel in the direction of the primary sense of direction of the vehicle 101. The first drive motor 181 draws electricity from the battery 133 of the control circuit 103.

The second driven suspension structure 162 attaches the aft starboard wheel selected from the plurality of wheels 113 to the vehicle 101 chassis 112. The second driven suspension structure 162 is a structure that is identical to the individual non-driven suspension structure 141. The second driven suspension structure 162 further comprises the second drive motor 182. The second drive motor 182 attaches the associated wheel to the inferior jib 145 of the individual non-driven suspension structure 141 of the second driven suspension structure 162 such that the rotation of the second drive motor 182 will drive the associated wheel in the direction of the primary sense of direction of the vehicle 101. The second drive motor 182 draws electricity from the battery 133 of the control circuit 103.

The first rotation motor 171 is the rotation motor of the individual non-driven suspension structure 141. The first rotation motor 171 attaches the suspension jib 143 of the first non-driven suspension structure 151 of the plurality of non-driven suspension structures 121 to the vehicle 101 chassis 112. The first rotation motor 171 rotates the individual non-driven suspension structure 141 relative to the vehicle 101 chassis 112 to change the primary sense of direction of the vehicle 101.

The second rotation motor 172 is the rotation motor of the individual non-driven suspension structure 141. The second rotation motor 172 attaches the suspension jib 143 of the second non-driven suspension structure 152 of the plurality of non-driven suspension structures 121 to the vehicle 101 chassis 112. The second rotation motor 172 rotates the individual non-driven suspension structure 141 relative to the vehicle 101 chassis 112 to change the primary sense of direction of the vehicle 101.

The third rotation motor 173 is the rotation motor of the individual non-driven suspension structure 141. The third rotation motor 173 attaches the suspension jib 143 of the first driven suspension structure 161 of the plurality of driven suspension structures 122 to the vehicle 101 chassis 112. The third rotation motor 173 rotates the individual non-driven suspension structure 141 relative to the vehicle 101 chassis 112 to change the primary sense of direction of the vehicle 101.

The fourth rotation motor 174 is the rotation motor of the individual non-driven suspension structure 141. The fourth rotation motor 174 attaches the suspension jib 143 of the second driven suspension structure 162 of the plurality of driven suspension structures 122 to the vehicle 101 chassis 112. The fourth rotation motor 174 rotates the individual non-driven suspension structure 141 relative to the vehicle 101 chassis 112 to change the primary sense of direction of the vehicle 101.

The control circuit 103 is an electrical circuit. The control circuit 103 provides the motive forces necessary to move the vehicle 101 in the primary sense of direction of the vehicle 101. The control circuit 103 provides the motive forces necessary to rotate the plurality of suspension structures 102 in order to adjust the primary sense of direction of the vehicle 101. The control circuit 103 is an electrically powered device.

The control circuit 103 converts rotational energy generated by the vehicle 101 engine 111 into a second source of chemical potential energy. The control circuit 103 stores the second source of chemical potential energy. The control circuit 103 converts the second source of stored chemical potential energy into the electrical energy used to rotate each of the plurality of wheels 113 in primary sense of direction. The control circuit 103 converts the second source of stored chemical potential energy into the electrical energy used to rotate each of the plurality of suspension structures 102 in a manner that changes the primary sense of direction of the vehicle 101. The control circuit 103 further monitors the surrounding of the vehicle 101 to ensure that the path along which the vehicle 101 is moving is large enough to receive the vehicle 101.

The control circuit 103 comprises a generator 131, a diode 132, a battery 133, and a logic circuit 134. The generator 131 is an electrical device. The generator 131 converts rotational energy provided by the vehicle 101 engine 111 into dc electric energy that is transmitted to the battery 133. The diode 132 is an electrical device that limits the flow of electric energy in an electric circuit to a single direction. The diode 132 electrically connects between the battery 133 and the generator 131 such that electric energy will not flow from the battery 133 into the generator 131.

The battery 133 is an electrochemical device. The battery 133 converts chemical potential energy into dc electrical energy used to power the operation of the plurality of rotation motors 123. The battery 133 converts chemical potential energy into dc electrical energy used to power the operation of the plurality of drive motors 124. By reversing the polarity of the battery 133, the generator 131 provides dc electrical energy to the battery 133 that the battery 133 converts into chemical potential energy. The plurality of rotation motors 123 and the plurality of drive motors 124 draw electrical energy directly from the battery 133.

The logic circuit 134 is an electric circuit. The logic circuit 134 monitors the path indicated by the primary sense of direction of the vehicle 101. The logic circuit 134 monitors the path for indications that the vehicle 101 may impact an object as the vehicle 101 moves along its primary sense of direction. The logic circuit 134 generates an electrical signal called the vehicle 101 fit signal 193 that indicates that the path of the primary sense of direction of the vehicle 101 is clear of obstructions. The logic circuit 134 further comprises a first proximity sensor 191, a second proximity sensor 192, and a vehicle 101 fit signal 193. The first proximity sensor 191, the second proximity sensor 192, and the vehicle 101 fit signal 193 are electrically interconnected.

The first proximity sensor 191 is an electric sensor. The logic circuit 134 monitors the operation of the first proximity sensor 191. The first proximity sensor 191 detects the presence of objects within the path of the primary sense of direction of the vehicle 101. The detection of an obstacle by the first proximity sensor 191 will cause the logic circuit 134 to discontinuation of the vehicle 101 fit signal 193. The second proximity sensor 192 is an electric sensor. The logic circuit 134 monitors the operation of the second proximity sensor 192. The second proximity sensor 192 detects the presence of objects within the path of the primary sense of direction of the vehicle 101. The detection of an obstacle by the second proximity sensor 192 will cause the logic circuit 134 to discontinuation of the vehicle 101 fit signal 193. The vehicle 101 fit signal 193 is an electric signal that is generated by the logic circuit 134. The vehicle 101 fit signal 193 is generated to indicate that neither the first proximity sensor 191 nor the second proximity sensor 192 are detecting an obstacle in the path of the primary sense of direction of the vehicle 101.

The following definitions were used in this disclosure:

Aft: As used in this disclosure, aft is term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Battery: As used in this disclosure, a battery is a chemical device consisting of one or more cells, in which chemical energy is converted into electricity and used as a source of power. Batteries are commonly defined with a positive terminal and a negative terminal.

Bow: As used in this disclosure, the bow refers to the anterior side of an object, vehicle, or vessel. Specifically, the bow refers to the most forward element of the object in the direction of the primary sense of direction of the object vehicle, or vessel.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Chassis: As used in this disclosure, a chassis is a wheeled structure that is used to transport an attached load.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Combustion engine: As used in this disclosure, a combustion engine is an engine powered by burning fuel within the engine. Two common examples would be: 1) internal combustion engines; and, 2) engines designed with one or more cylinders where combustion takes place within the cylinder.

Congruent: As used in this disclosure, congruent is a term that compares a first object to a second object. Specifically, two objects are said to be congruent when: 1)

they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drive: As used in this disclosure, a drive is a mechanism or a device that transmits a motive force from a first device or object to a second device or object with the objective of operating the second object.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Engine: As used in this disclosure, an engine is a device with moving parts that is used to convert energy into rotational or linear motion.

Extension Structure: As used in this disclosure, an extension structure is an inert physical structure that is used to extend or bridge the reach between any two objects.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Generator: In this disclosure, a generator is a machine that converts rotational mechanical energy into electric energy. A generator typically comprises a stator and a rotor. The stator is a stationary hollow cylindrical structure that forms a magnetic field. The rotor is a rotating cylindrical structure that is coaxially mounted in the stator. The rotation of the rotor within the stator physically generates the electrical energy. A generator can generated an electrical voltage selected from the group consisting of an AC voltage and a DC voltage. When a DC voltage is generated, this disclosure assumes that the term generator includes commutator and electrical circuitry required to generate a regulated DC voltage.

Ground: As used in this disclosure, the ground is a solid supporting surface formed by the Earth. The term level ground means that the supporting surface formed by the ground is roughly perpendicular to the force of gravity.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Impact: As used in this disclosure, an impact refers to an exchange of momentum between two objects over a duration. An impact often refers to a collision between two objects.

Impulse: As used in this disclosure, an impulse refers to the application of a force over a period of time. The use of the term impulse often implies a relatively short period of time.

Inferior: As used in this disclosure, the term inferior refers to a directional reference that is parallel to and in the same direction as the force of gravity when an object is positioned or used normally.

Jib: As used in this disclosure, a jib is a beam structure that is used to suspend a load.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Circuit: As used in this disclosure, a logic circuit is electrical device that receives one or more digital or analog inputs and uses those digital or analog inputs to generate one or more digital or analog outputs. This disclosure allows, but does not assume, that the logic circuit is programmable.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs which are used determine the desired rotational speed and direction of rotation of the electric motor.

Negative Space: As used in this disclosure, negative space is a method of defining an object through the use of open or empty space as the definition of the object itself, or, through the use of open or empty space to describe the boundaries of an object.

Non-Euclidean Structure: As used in this disclosure, a non-Euclidean structure is a structure wherein an axis of the structure lies on a non-Euclidean plane or is otherwise formed with a curvature.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Perimeter: As used in this disclosure, a perimeter is one or more curved or straight lines that bounds an enclosed area on a plane or surface. The perimeter of a circle is commonly referred to as a circumference.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reduction-Oxidation Reaction: As used in this disclosure, a reduction-oxidation reaction (also known as a redox reaction) is a chemical reaction involving the transfer of electrons between the reactants of the reaction.

Roll: As used in this disclosure, the term roll refers to the motion of an object that is facilitated by the rotation of one or more wheels or a casters.

Roll: As used in this disclosure, the term roll refers to the rotation of an object around an axis or center of rotation.

Servo Motor: As used in this disclosure, a servo motor is an electrical motor that further incorporates a feedback circuit that allows for the precise angular positioning of the electric motor.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tire: As used in this disclosure, a tire is a solid or air filled covering for a wheel. The purpose of the tire is to absorb shocks, provide traction, and protect the wheel from wear and other damage.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

With respect to the above description, it is to be realized that the optimum dimensional relationship for the various components of the invention described above and in FIGS. 1 through 12 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicular parallel parking device comprising
a vehicle, a plurality of suspension structures, and a control circuit;
wherein the vehicular parallel parking device is a mechanical structure;
wherein the vehicular parallel parking device is used with the vehicle;
wherein the vehicular parallel parking device is defined with a primary sense of direction;
wherein the vehicular parallel parking device rotates the primary sense of direction of the vehicle by ninety degrees such that the vehicle can be driven directly into a parking spot during parallel parking activities;
wherein the vehicle further comprises a vehicle engine, a vehicle chassis, and a plurality of wheels;
wherein the plurality of suspension structures attach the plurality of wheels to the vehicle chassis;
wherein the plurality of suspension structures comprises a plurality of non-driven suspension structures and a plurality of driven suspension structures;
wherein each individual non-driven suspension structure comprises an individual rotation motor and a suspension jib;
wherein the individual rotation motor attaches the suspension jib to the vehicle chassis.

2. The vehicular parallel parking device according to claim 1
wherein each of the plurality of suspension structures are rotating structures;
wherein the rotation of each of the plurality of suspension structures changes the primary sense of direction;
wherein the control circuit is an electromechanical structure;
wherein the control circuit provides the motive forces necessary to rotate the plurality of suspension structures.

3. The vehicular parallel parking device according to claim 2
wherein the vehicle engine is a combustion engine;
wherein the vehicle chassis is an intermediate structure;
wherein the vehicle chassis forms a pedestal structure that transfers the load of the vehicle to the plurality of wheels through the plurality of suspension structures;
wherein the plurality of suspension structures attaches each of the plurality of wheels to the vehicle chassis such that each of the plurality of wheels rotates freely in two perpendicular directions relative to the vehicle chassis;
wherein each of the plurality of wheels are attached to the plurality of wheels such that the vehicle will roll over a road network.

4. The vehicular parallel parking device according to claim 3
wherein each of the plurality of suspension structures is a mechanical structure;
wherein each of the plurality of suspension structures attaches a wheel selected from the plurality of wheels to the vehicle chassis;
wherein the selected wheel associated with each suspension structure selected from the plurality of suspension structures attaches to the selected structure such that the wheel freely rolls in the primary sense of direction of the vehicle.

5. The vehicular parallel parking device according to claim 4
wherein each of the plurality of suspension structures are the rotating structures;
wherein each of the plurality of suspension structures rotates along an axis of rotation that is vertically oriented;
wherein the axis of rotation of each suspension structure of the plurality of suspension structures is perpendicular to the axis of rotation of the associated selected wheel;
wherein the rotation of each of the plurality of suspension structures changes the primary sense of direction of the vehicle by changing the direction of rotation of each of the plurality of wheels.

6. The vehicular parallel parking device according to claim 5
wherein the control circuit is an electrical circuit;
wherein the control circuit provides the motive forces necessary to move the vehicle in the primary sense of direction of the vehicle;
wherein the control circuit provides the motive forces necessary to rotate the plurality of suspension structures in order to adjust the primary sense of direction of the vehicle;
wherein the control circuit is an electrically powered device;
wherein the control circuit converts rotational energy generated by the vehicle engine into a second source of chemical potential energy;
wherein the control circuit stores the second source of chemical potential energy;
wherein the control circuit converts the second source of stored chemical potential energy into the electrical energy used to rotate each of the plurality of wheels in primary sense of direction;
wherein the control circuit converts the second source of stored chemical potential energy into the electrical energy used to rotate each of the plurality of suspension structures in a manner that changes the primary sense of direction of the vehicle;

wherein the control circuit further monitors the surrounding of the vehicle to ensure that the path along which the vehicle is moving is large enough to receive the vehicle.

7. The vehicular parallel parking device according to claim 6
wherein each of the plurality of non-driven suspension structures attaches a wheel selected from the plurality of wheels to the vehicle chassis;
wherein each of the plurality of driven suspension structures attaches a wheel selected from the plurality of wheels to the vehicle chassis;
wherein the plurality of suspension structures further comprises a plurality of rotation motors and a plurality of drive motors;
wherein each of the plurality of rotation motors is an electric motor used to rotate the individual non-driven suspension structure of each of the plurality of non-driven suspension structures;
wherein each of the plurality of drive motors is an electric motor used to drive one or more wheels selected from the plurality of wheels such that the driven wheels will move the vehicle in a primary sense of direction.

8. The vehicular parallel parking device according to claim 7
wherein the control circuit comprises a generator, a diode, a battery, and a logic circuit;
wherein the diode electrically connects between the battery and the generator;
wherein the logic circuit is an electric circuit;
wherein the logic circuit monitors the path indicated by the primary sense of direction of the vehicle.

9. The vehicular parallel parking device according to claim 8
wherein each of the plurality of non-driven suspension structures are the mechanical structures;
wherein each of the plurality of non-driven suspension structures are the rotating structures;
wherein by rotating is meant that each of the plurality of non-driven suspension structures around the vertically oriented axis of rotation;
wherein the rotation of each of the plurality of non-driven suspension structures adjusts the orientation of the associate wheel relative to the vehicle chassis such that the primary sense of direction of the vehicle is changed;
wherein each of the plurality of driven suspension structures are the mechanical structures;
wherein each of the plurality of driven suspension structures are the rotating structures;
wherein by rotating is meant that each of the plurality of driven suspension structures rotates around the vertically oriented axis of rotation;
wherein the rotation of each of the plurality of driven suspension structures adjusts the orientation of the associated wheel relative to the vehicle chassis such that the primary sense of direction of the vehicle is changed;
wherein the plurality of driven suspension structures provides the motive force necessary to rotate the wheel associated with any selected driven suspension structure such that the vehicle will move in the primary sense of direction of the vehicle.

10. The vehicular parallel parking device according to claim 9
wherein the plurality of non-driven suspension structures comprises a collection of individual non-driven wheel structures;
wherein the individual non-driven suspension structure are the mechanical structures;
wherein the individual non-driven suspension structure forms a load path that transfers the load of the vehicle to a wheel selected from the plurality of wheels.

11. The vehicular parallel parking device according to claim 10
wherein the individual non-driven suspension structure are the rotating structures;
wherein the individual non-driven suspension structure rotates the orientation of the wheel selected form the plurality of wheels such that the primary sense of the direction of the vehicle is adjusted;
wherein the center of rotation of the individual non-driven suspension structure is vertically oriented;
wherein the individual non-driven suspension structure is further configured to buffer the transfer of impact energy between the plurality of wheels and the vehicle chassis.

12. The vehicular parallel parking device according to claim 11
wherein the individual rotation motor is the electric motor;
wherein the individual rotation motor is selected from the plurality of rotation motors;
wherein the individual rotation motor rotates the suspension jib relative to the vehicle chassis such that the center of rotation of the suspension jib is vertically oriented;
wherein the individual rotation motor rotates the suspension jib such that the wheel attached to the suspension jib rotates to adjust the primary sense of direction of the vehicle.

13. The vehicular parallel parking device according to claim 12
wherein the suspension jib forms an extension structure that attaches the wheel selected from the plurality of wheels that is associated with the individual non-driven suspension structure to the individual rotation motor;
wherein the suspension jib attaches to the wheel associated with the individual non-driven suspension structure such that the wheel rotates freely relative to the suspension jib around a horizontally oriented center of rotation;
wherein the suspension jib attaches to the individual rotation motor such that the rotation of the individual rotation motor rotates the suspension jib and the attached wheel around a vertically oriented center of rotation that is aligned with the center of rotation of the individual rotation motor;
wherein the suspension jib forms a buffer that physically dampens the transfer of impact energy between the plurality of wheels and the vehicle chassis through the individual non-driven suspension structure.

14. The vehicular parallel parking device according to claim 13
wherein the suspension jib further comprises a superior jib, an inferior jib, and a shock absorber;
wherein the shock absorber attaches the inferior jib to the superior jib;
wherein the shock absorber forms the buffer that physically dampens the transfer of impact energy between the plurality of wheels and the vehicle chassis;
wherein specifically, the shock absorber is a spring structure that stores and dissipates the received impact energy;

wherein the superior jib is a rigid mechanical structure that physically attaches the shock absorber to the individual rotation motor;

wherein the inferior jib is a rigid mechanical structure that physically attaches the shock absorber to the associated wheel selected from the plurality of wheels.

15. The vehicular parallel parking device according to claim 14 wherein each of the plurality of driven suspension structures further comprises a drive motor selected from the plurality of drive motors;

wherein the plurality of non-driven suspension structures comprises a first non-driven suspension structure and a second non-driven suspension structure;

wherein the plurality of driven suspension structures comprises a first driven suspension structure and a second driven suspension structure;

wherein the plurality of drive motors comprises a first drive motor and a second drive motor.

16. The vehicular parallel parking device according to claim 15 wherein the first non-driven suspension structure is an individual non-driven suspension structure;

wherein the first non-driven suspension structure attaches the forward port wheel selected from the plurality of wheels to the vehicle chassis;

wherein the second non-driven suspension structure is an individual non-driven suspension structure;

wherein the second non-driven suspension structure attaches the forward starboard wheel selected from the plurality of wheels to the vehicle chassis;

wherein the first driven suspension structure attaches the aft port wheel selected from the plurality of wheels to the vehicle chassis;

wherein the first driven suspension structure is a structure that is identical to the individual non-driven suspension structure;

wherein the first driven suspension structure further comprises the first drive motor;

wherein the first drive motor attaches the associated wheel to the inferior jib of the individual non-driven suspension structure of the first driven suspension structure such that the rotation of the first drive motor will drive the associated wheel in the direction of the primary sense of direction of the vehicle;

wherein the first drive motor draws electricity from the battery of the control circuit;

wherein the second driven suspension structure attaches the aft starboard wheel selected from the plurality of wheels to the vehicle chassis;

wherein the second driven suspension structure is a structure that is identical to the individual non-driven suspension structure;

wherein the second driven suspension structure further comprises the second drive motor;

wherein the second drive motor attaches the associated wheel to the inferior jib of the individual non-driven suspension structure of the second driven suspension structure such that the rotation of the second drive motor will drive the associated wheel in the direction of the primary sense of direction of the vehicle;

wherein the second drive motor draws electricity from the battery of the control circuit.

17. The vehicular parallel parking device according to claim 16 wherein the plurality of rotation motors comprises a first rotation motor, a second rotation motor, a third rotation motor, and a fourth rotation motor;

wherein the first rotation motor is the rotation motor of the individual non-driven suspension structure;

wherein the first rotation motor attaches the suspension jib of the first non-driven suspension structure of the plurality of non-driven suspension structures to the vehicle chassis;

wherein the first rotation motor rotates the individual non-driven suspension structure relative to the vehicle chassis to change the primary sense of direction of the vehicle;

wherein the second rotation motor is the rotation motor of the individual non-driven suspension structure;

wherein the second rotation motor attaches the suspension jib of the second non-driven suspension structure of the plurality of non-driven suspension structures to the vehicle chassis;

wherein the second rotation motor rotates the individual non-driven suspension structure relative to the vehicle chassis to change the primary sense of direction of the vehicle;

wherein the third rotation motor is the rotation motor of the individual non-driven suspension structure;

wherein the third rotation motor attaches the suspension jib of the first driven suspension structure of the plurality of driven suspension structures to the vehicle chassis;

wherein the third rotation motor rotates the individual non-driven suspension structure relative to the vehicle chassis to change the primary sense of direction of the vehicle;

wherein the fourth rotation motor is the rotation motor of the individual non-driven suspension structure;

wherein the fourth rotation motor attaches the suspension jib of the second driven suspension structure of the plurality of driven suspension structures to the vehicle chassis;

wherein the fourth rotation motor rotates the individual non-driven suspension structure relative to the vehicle chassis to change the primary sense of direction of the vehicle.

18. The vehicular parallel parking device according to claim 17 wherein the generator is an electrical device;

wherein the generator converts rotational energy provided by the vehicle engine into dc electric energy that is transmitted to the battery;

wherein the diode is an electrical device that limits the flow of electric energy in an electric circuit to a single direction;

wherein the diode electrically connects between the battery and the generator such that electric energy will not flow from the battery into the generator;

wherein the battery is an electrochemical device;

wherein the battery converts chemical potential energy into dc electrical energy used to power the operation of the plurality of rotation motors;

wherein the battery converts chemical potential energy into dc electrical energy used to power the operation of the plurality of drive motors;

wherein by reversing the polarity of the battery, the generator provides dc electrical energy to the battery that the battery converts into chemical potential energy;

wherein the plurality of rotation motors and the plurality of drive motors draw electrical energy directly from the battery;

wherein the logic circuit monitors the path for indications that the vehicle may impact an object as the vehicle moves along its primary sense of direction;

wherein the logic circuit generates an electrical signal called the vehicle fit signal that indicates that the path of the primary sense of direction of the vehicle is clear of obstructions.

19. The vehicular parallel parking device according to claim 18 wherein the logic circuit further comprises a first proximity sensor, a second proximity sensor, and a vehicle fit signal;

wherein the first proximity sensor, the second proximity sensor, and the vehicle fit signal are electrically interconnected;

wherein the first proximity sensor is an electric sensor;

wherein the logic circuit monitors the operation of the first proximity sensor;

wherein the first proximity sensor detects the presence of objects within the path of the primary sense of direction of the vehicle;

wherein the detection of an obstacle by the first proximity sensor will cause the logic circuit to discontinuation of the vehicle fit signal;

wherein the second proximity sensor is an electric sensor;

wherein the logic circuit monitors the operation of the second proximity sensor;

wherein the second proximity sensor detects the presence of objects within the path of the primary sense of direction of the vehicle;

wherein the detection of an obstacle by the second proximity sensor will cause the logic circuit to discontinuation of the vehicle fit signal;

wherein the vehicle fit signal is an electric signal that is generated by the logic circuit;

wherein the vehicle fit signal is generated to indicate that neither the first proximity sensor nor the second proximity sensor are detecting an obstacle in the path of the primary sense of direction of the vehicle.

\* \* \* \* \*